(No Model.)
J. A. BERLIN.
SAD IRON.
No. 424,753.  Patented Apr. 1, 1890.
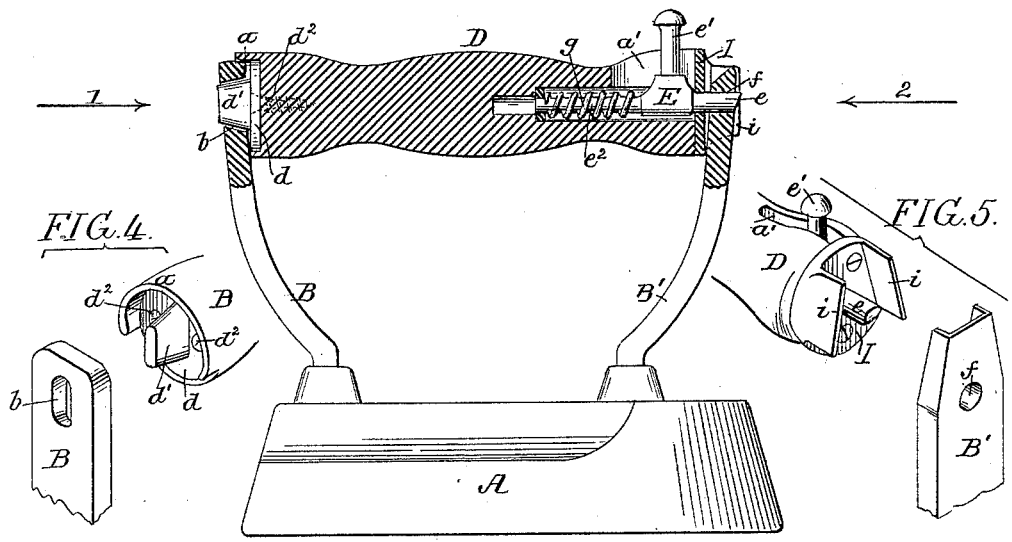
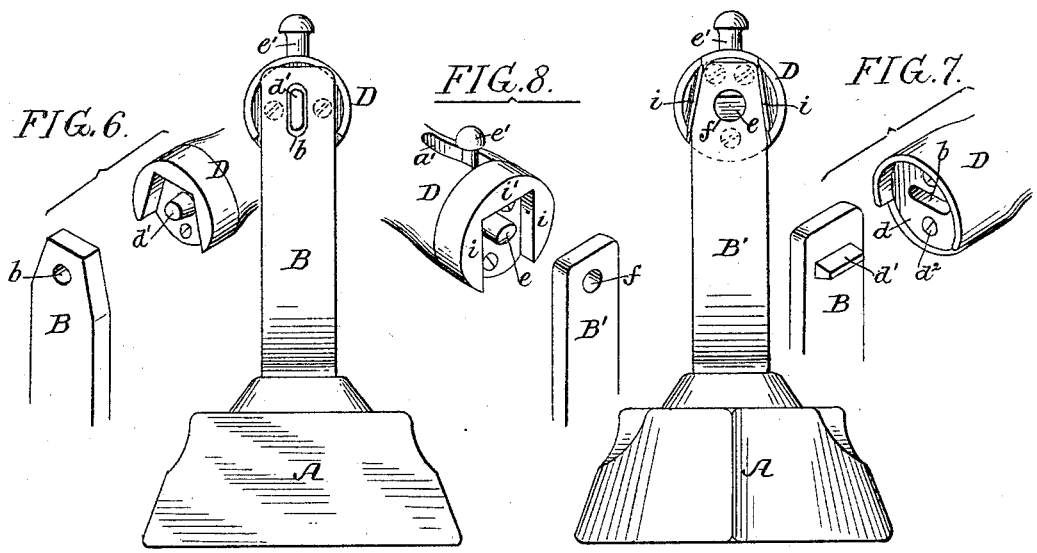
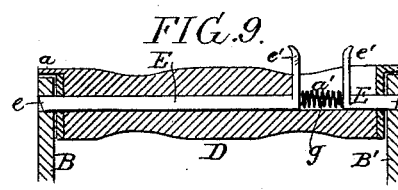
Witnesses:
John T. Lewis
William D. Conner
Inventor:
John A. Berlin
by his Attorneys
Howson & Howson

UNITED STATES PATENT OFFICE.

JOHN A. BERLIN, OF QUINCY, ILLINOIS.

SAD-IRON.

SPECIFICATION forming part of Letters Patent No. 424,753, dated April 1, 1890.

Application filed January 16, 1889. Serial No. 296,495. (No model.)

*To all whom it may concern:*

Be it known that I, JOHN A. BERLIN, a citizen of the United States, and a resident of Quincy, Adams county, Illinois, have invented certain Improvements in Sad-Irons, of which the following is a specification.

The object of my invention is to provide a sad-iron with a handle which, while detachable from the two permanent arms of the iron, will when in place be perfectly rigid and secure, as fully described hereinafter.

In the accompanying drawings, Figure 1 is a side view of an iron with a handle in section, showing my improvement. Fig. 2 is an end view looking in the direction of the arrow 1, Fig. 1. Fig. 3 is an end view looking in the direction of the arrow 2, Fig. 1. Fig. 4 is a detached perspective view of one end of a handle with a part of the upright arm. Fig. 5 is a detached perspective view of the opposite end of the handle and a portion of the upright arm, and Figs. 6, 7, 8, and 9 are views of modifications.

Referring to the drawings, A is the base of the sad-iron, cast in the usual manner and of any shape required.

B B' are the arms, cast into the base A in the present instance and curved in shape; but it will be understood that they may be of any form desirable without departing from my invention.

D is the handle of the iron, adapted to fit snugly between the two arms B B', and is detachable therefrom.

In the arm B is an elongated orifice $b$, as shown more clearly in Fig. 4. Into the orifice projects a lug $d'$, also oblong in shape and tapered in form, so as to snugly fit in the orifice $b$ and prevent the handle from turning. The lug $d'$ projects from a plate $d$, circular in form, the plate being secured to the handle D by screws $d^2$.

I prefer to recess the end of the handle D, as shown in Fig. 4, thus forming a rim $a$ around the upper portion of the handle. This rim extends over a portion of the arm B and prevents the hand coming in contact with the metallic part of the iron. In the opposite end of the handle is a bolt E, the latch $e$ of this bolt being adapted to an orifice $f$ in the arm B'. The bolt is pushed into the orifice by a spring $g$, which surrounds the shank $e^2$ of the bolt. The handle $e'$ projects through a slot $a'$ in the handle convenient to the operator, so that by merely pulling this handle back the bolt will be released and the handle can be removed from the iron. In this instance on the bolt end of the handle is a disk I, through which passes the latch $e$ of the bolt.

Projecting from the disk I are wings $i\ i$, inclined as shown in Figs. 3 and 5. These wings fit snugly over the tapered end of the arm B' and take the strain from the latch of the bolt. In place of the inclined wings $i\ i$, this end of the handle may be recessed similar to the opposite end of the handle, and may be square in form, as shown in Fig. 8, so as to fit snugly over the arm B', the portion $i'$ resting directly upon the arm.

In Fig. 6 I have shown the orifice $b$ of the arm B circular in form and the recess tapered, as at the opposite end, so that the strain will be taken off the pin.

In Fig. 7 I have shown the pin $d'$ on the arm and an orifice in the handle, the pin in this instance being oblong in shape. It will be understood, however, that the shape of the securing-pins and the shape of the bolt may be varied according to circumstances.

In Fig. 9 I have shown my handle with both ends recessed, and two bolts, one at each end, so that the handle can be forced straight into position.

I claim as my invention.

1. The combination, in a sad-iron, of the base, arms B B', projecting therefrom, with a detachable handle longitudinally confined between said arms, a metallic plate on each end of said handle, one plate $d$ having an oblong pin adapted to an orifice in the arm B, the other plate having wings adapted to the upper portion of the arm B', with a bolt in the handle adapted to pass through the winged plate and engage with the arm B', substantially as specified.

2. The combination, in a sad-iron, of the base A, the arms B B', permanently secured thereto, one arm having an orifice, a detachable handle with a spring-bolt therein adapted to said orifice, with a plate having tapered wings adapted to the tapered upper portion of the arm, so as to take the strain off the bolt, and a pin-connection at the opposite end of said handle with the opposite arm, substantially as described.

In testimony whereof I have signed my name to this specification in the presence of two subscribing witnesses.

JOHN A. BERLIN.

Witnesses:
H. HEIDBREDER,
AUG. H. HEIDBREDER.